(12) United States Patent
Kim et al.

(10) Patent No.: US 10,941,043 B2
(45) Date of Patent: *Mar. 9, 2021

(54) METHOD OF PREPARING METAL OXIDE-SILICA COMPOSITE AEROGEL AND METAL OXIDE-SILICA COMPOSITE AEROGEL PREPARED BY USING THE SAME

(71) Applicant: LG CHEM, LTD., Seoul (KR)

(72) Inventors: Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 462 days.

This patent is subject to a terminal disclaimer.

(21) Appl. No.: 15/577,750

(22) PCT Filed: Jun. 1, 2016

(86) PCT No.: PCT/KR2016/005814
§ 371 (c)(1),
(2) Date: Nov. 28, 2017

(87) PCT Pub. No.: WO2016/195379
PCT Pub. Date: Dec. 8, 2016

(65) Prior Publication Data
US 2018/0127279 A1    May 10, 2018

(30) Foreign Application Priority Data

Jun. 1, 2015 (KR) .......................... 10-2015-0077278
Jun. 1, 2016 (KR) .......................... 10-2016-0067869

(51) Int. Cl.
*C01B 33/24* (2006.01)
*C01B 33/158* (2006.01)
(Continued)

(52) U.S. Cl.
CPC ............ *C01B 33/1585* (2013.01); *B01J 20/02* (2013.01); *B01J 20/04* (2013.01); *C01D 1/02* (2013.01);
(Continued)

(58) Field of Classification Search
CPC ... C01B 33/1585; C01B 33/158; C01B 33/14; C01B 33/24; B01J 13/0091; B01J 20/04
See application file for complete search history.

(56) References Cited

U.S. PATENT DOCUMENTS

| 2,241,791 A | 5/1941 | Rembert |
| 2,434,418 A | 1/1948 | La Lande, Jr. |

(Continued)

FOREIGN PATENT DOCUMENTS

| CN | 101132856 | 2/2008 |
| CN | 103476707 | 12/2013 |

(Continued)

OTHER PUBLICATIONS

English translation of Ahn KR-10-2010-0090989. Obtained from Espacenet on May 5, 2020.*

(Continued)

*Primary Examiner* — Michael A Salvitti
(74) *Attorney, Agent, or Firm* — Dentons US LLP (57) ABSTRACT

Provided are a method of preparing a metal oxide-silica composite aerogel which includes preparing a silicate solution by dissolving water glass at a concentration of 0.125 M to 3.0 M, after adding and mixing a metal salt solution having a metal ion concentration of 0.125 M to 3.0 M to the silicate solution, precipitating metal oxide-silica composite precipitates by adjusting a pH of a resulting mixture to be in a range of 3 to 9, and separating and drying the metal oxide-silica composite precipitates, wherein the metal salt solution includes a magnesium (Mg)-containing metal salt in (Continued)

an amount such that an amount of magnesium ions is greater than 50 mol % based on a total mole of metal ions in the metal salt solution, and a metal oxide-silica composite aerogel having low tap density and high specific surface area prepared by the method.

9 Claims, 2 Drawing Sheets

(51) Int. Cl.
| | |
|---|---|
| *B01J 20/04* | (2006.01) |
| *C01F 5/02* | (2006.01) |
| *B01J 20/02* | (2006.01) |
| *C01D 1/02* | (2006.01) |
| *C01F 5/06* | (2006.01) |
| *C01F 5/30* | (2006.01) |
| *C01F 11/24* | (2006.01) |

(52) U.S. Cl.
CPC ............... *C01F 5/02* (2013.01); *C01F 5/06* (2013.01); *C01F 5/30* (2013.01); *C01F 11/24* (2013.01); *C01P 2002/50* (2013.01); *C01P 2006/11* (2013.01); *C01P 2006/12* (2013.01); *C01P 2006/14* (2013.01); *C01P 2006/32* (2013.01)

(56) References Cited

U.S. PATENT DOCUMENTS

| | | | |
|---|---|---|---|
| 3,473,890 | A | 10/1969 | Reinhardt et al. |
| 3,977,993 | A | 8/1976 | Lynch |
| 4,367,292 | A * | 1/1983 | Sano ................. C04B 35/195 423/328.2 |
| 5,811,031 | A | 9/1998 | Jansen et al. |
| 5,851,947 | A | 12/1998 | Hair et al. |
| 5,948,482 | A | 9/1999 | Brinker et al. |
| 6,315,971 | B1 | 11/2001 | Wallace et al. |
| 7,736,611 | B2 | 6/2010 | Norberg et al. |
| 9,199,853 | B2 | 12/2015 | Tomimatsu et al. |
| 10,399,857 | B2 * | 9/2019 | Jeon ..................... C01B 33/158 |
| 10,556,800 | B2 * | 2/2020 | Kim ......................... C01F 5/02 |
| 2001/0034375 | A1 * | 10/2001 | Schwertfeger ....... B01J 13/0091 516/98 |
| 2008/0034968 | A1 | 2/2008 | Nordberg et al. |
| 2011/0000370 | A1 * | 1/2011 | Norberg ................. B01D 53/62 95/90 |
| 2013/0106008 | A1 | 5/2013 | Ahn et al. |
| 2014/0057111 | A1 | 2/2014 | Tomimatsu Fujimoto et al. |
| 2018/0127277 | A1 | 5/2018 | Kim et al. |
| 2018/0127278 | A1 * | 5/2018 | Kim .................. B01J 20/28069 |
| 2018/0127279 | A1 * | 5/2018 | Kim ......................... C01F 5/02 |
| 2020/0010328 | A1 * | 1/2020 | Kim ..................... B01J 13/0091 |

FOREIGN PATENT DOCUMENTS

| | | |
|---|---|---|
| CN | 104495859 | 4/2015 |
| EP | 3305725 | 4/2018 |
| EP | 3305726 | 4/2018 |
| EP | 3305727 | 4/2018 |
| JP | H0264007 | 3/1990 |
| JP | H11139819 | 5/1999 |
| JP | 2000034117 | 2/2000 |
| JP | 2012172378 | 9/2012 |
| JP | 2014051643 | 3/2014 |
| KR | 10-0785521 | 12/2007 |
| KR | 10-2009-0115714 | 11/2009 |
| KR | 10-2010-0065692 | 6/2010 |
| KR | 10-2010-0090989 | 8/2010 |
| KR | 10-2011-0046715 | 5/2011 |
| KR | 10-1323303 | 10/2013 |
| KR | 10-2014-0005177 | 1/2014 |
| KR | 10-2014-0076022 | 6/2014 |
| KR | 10-2014-0146814 | 12/2014 |
| WO | 1998045032 | 10/1998 |
| WO | 2013118940 | 8/2013 |

OTHER PUBLICATIONS

Giesche, "Mercury Porosimetry: A General (Practical) Overview," Part. Part. Syst. Charact. 23: 9-19 (2006).
Extended Search Report of European Patent Office in Appl'n No. 16803735.6, dated Apr. 25, 2018.
Extended Search Report of European Patent Office in Appl'n No. 16803734.9, dated May 4, 2018.
Extended Search Report of European Patent Office in Appl'n No. 16803736.4, dated May 9, 2018.
Office Action of the Korean Patent Office in Appl'n No. 10-2016-0067870, dated May 11, 2018.
U.S. Appl. No. 15/577,747.
U.S. Appl. No. 15/577,742.

* cited by examiner

METHOD OF PREPARING METAL OXIDE-SILICA COMPOSITE AEROGEL AND METAL OXIDE-SILICA COMPOSITE AEROGEL PREPARED BY USING THE SAME

CROSS-REFERENCE TO RELATED APPLICATIONS

This application is a National Stage Application of International Application No. PCT/KR2016/005814 filed on Jun. 1, 2016, which claims priority to and the benefit of Korean Patent Application Nos. 2015-0077278, filed on Jun. 1, 2015, and 2016-0067869, filed on Jun. 1, 2016, all of which are incorporated herein in their entirety by reference for all purposes as if fully set forth herein.

TECHNICAL FIELD

The present invention relates to a method of preparing a metal oxide-silica composite aerogel having low tap density and high specific surface area by a simple preparation process without separate aging, solvent substitution, and surface modification steps, and a metal oxide-silica composite aerogel prepared by using the same.

BACKGROUND ART

Recently, interests in an aerogel having excellent heat insulation properties have grown as industrial technologies are modernized. Aerogels developed to date may include an organic aerogel, such as resorcinol-formaldehyde or melamine-formaldehyde aerogel particles, and an inorganic aerogel including metal oxide such as a silica ($SiO_2$), alumina ($Al_2O_3$), titania ($TiO_2$), or carbon (C) aerogel.

Among these aerogels, the silica aerogel is a highly porous material, wherein, since the silica aerogel may exhibit an excellent heat insulation effect by having high porosity and specific surface area as well as low thermal conductivity, applications in various areas, such as heat insulation materials, catalysts, sound-absorbing materials, and interlayer dielectric materials of a semiconductor circuit, are expected.

Since the silica aerogel has low mechanical strength due to its porous structure, the silica aerogel is normally commercialized in a form, such as an aerogel blanket or aerogel sheet, by compositing with a base material such as glass fibers, ceramic fibers, or polymer fibers. However, since the silica aerogel structurally contains 90 vol % or more of air in an internal pore, the silica aerogel has limitations in that scattering is severe during processing due to excessively low density and it is difficult to impregnate the silica aerogel into the base material. Also, since the silica aerogel is not mixed well due to an excessively large difference in density with respect to the base material even if a portion of the silica aerogel is impregnated, limitations, such as appearance defects and physical property deterioration, may occur. Furthermore, the silica aerogel must be mixed in a volume fraction of 5 vol % or more to achieve the heat insulation effect due to filling by efficiently blocking heat transfer, but it is not easy to process the powder itself at such a high mixing ratio.

Accordingly, in order to improve the properties of the aerogel, such as heat insulation, sound absorption, and catalytic activity, as well as processability of the silica aerogel or provide additionally required properties, a method of mixing an additive with the aerogel has been proposed. Specifically, a method of strengthening a structure and increasing density by introducing elements heavier than silicon (Si), such as titanium (Ti) and iron (Fe), into a silica aerogel skeleton by a method of adding the additive to a sol before polymerization of the silica aerogel or contacting the prepared silica aerogel with a liquid or vapor stream containing the additive, or a method of forming a composite with an inorganic material having a plate structure has been proposed.

However, convention methods have limitations in that control of size and particle size distribution of the additive materials is not easy, and deformation and reduction of the pore structure occur during the preparation of the silica aerogel.

DISCLOSURE OF THE INVENTION

Technical Problem

An aspect of the present invention provides a method of preparing a metal oxide-silica composite aerogel having excellent physical properties, such as low tap density and high specific surface area, by a simple preparation process without separate aging, solvent substitution, and surface modification steps.

Another aspect of the present invention provides a metal oxide-silica composite aerogel prepared by the above preparation method.

Technical Solution

According to an aspect of the present invention, there is provided a method of preparing a metal oxide-silica composite aerogel including: preparing a silicate solution by dissolving water glass at a concentration of 0.125 M to 3.0 M; after adding and mixing a metal salt solution having a metal ion concentration of 0.125 M to 3.0 M to the silicate solution, precipitating metal oxide-silica composite precipitates by adjusting a pH of a resulting mixture to be in a range of 3 to 9 by adding an acid catalyst; and separating and drying the metal oxide-silica composite precipitates, wherein the metal salt solution includes a magnesium (Mg)-containing metal salt in an amount such that an amount of magnesium ions is greater than 50 mol % based on a total mole of metal ions in the metal salt solution.

According to another aspect of the present invention, there is provided a metal oxide-silica composite aerogel prepared by the method.

Advantageous Effects

A method of preparing a metal oxide-silica composite aerogel according to the present invention may prepare a metal oxide-silica composite aerogel having excellent physical properties, such as low tap density and high specific surface area, as well as excellent pore properties by a simple preparation process without separate aging, solvent substitution, and surface modification steps. Accordingly, the metal oxide-silica composite aerogel prepared by the above preparation method may be used in various industrial areas, for example, catalysts or heat insulation materials, due to the above-described pore and physical properties.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
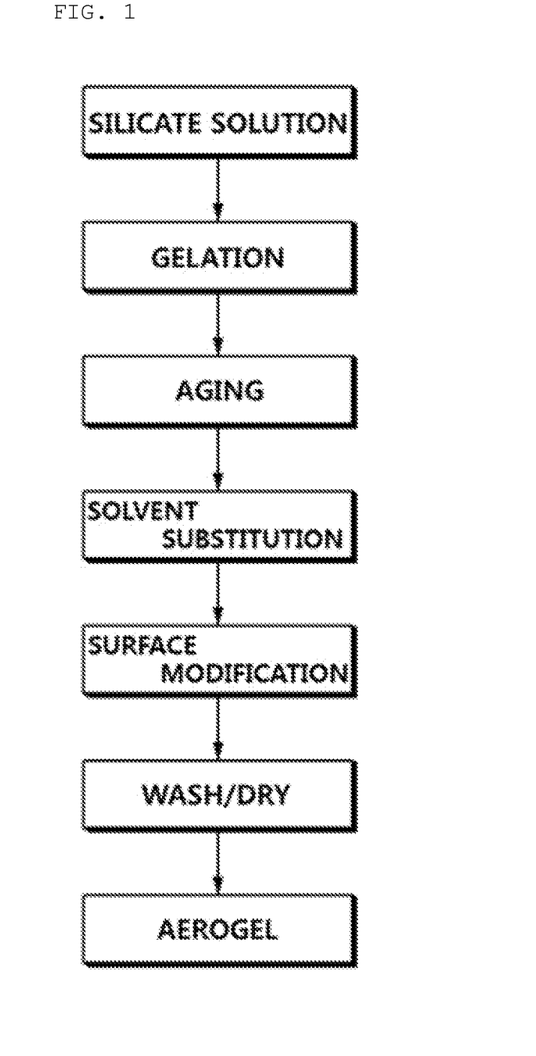
FIG. 1 is a block diagram sequentially illustrating a typical process of preparing a metal oxide-silica composite aerogel.

FIG. 1 is a block diagram sequentially illustrating a typical process of preparing a metal oxide-silica composite aerogel. As illustrated in FIG. 1, in a typical case, a silicate solution, which is prepared by mixing water glass with water, is solated by adding an acid catalyst thereto, the sol is subsequently gelated, and a metal oxide-silica composite aerogel is then prepared by performing aging, solvent substitution, surface modification, washing, and drying processes on the gel. Thus, the typical method of preparing a silica aerogel may have limitations in that the preparation process is complex, a large amount of wastewater is generated due to the use of an organic solvent during the solvent substitution, and an excessive amount of a surface modifier is consumed in the surface modification process.

In contrast, in the present invention, a metal oxide-silica composite aerogel having high specific surface area and pore volume as well as low tap density may be prepared by a simple preparation method, in which metal oxide-silica composite precipitates are synthesized by adding a metal salt solution, in which an amount of magnesium ions is controlled, to a silicate solution, in which a concentration of a reactant is controlled, and controlling a pH of a mixed liquid of the silicate solution and the metal salt solution by using an acid catalyst, and the metal oxide-silica composite precipitates are dried, without aging, solvent substitution, and surface modification steps.

Specifically, a method of preparing a metal oxide-silica composite aerogel (hereinafter, simply referred to as 'composite aerogel') according to an embodiment of the present invention includes the steps of: preparing a silicate solution by dissolving water glass at a concentration of 0.125 M to 3.0 M (step 1); after adding and mixing a metal salt solution having a metal ion concentration of 0.125 M to 3.0 M to the silicate solution, precipitating metal oxide-silica composite precipitates by adjusting a pH of a resulting mixture to be in a range of 3 to 9 by adding an acid catalyst (step 2); and separating and drying the metal oxide-silica composite precipitates (step 3), wherein the metal salt solution includes a magnesium (Mg)-containing metal salt in an amount such that an amount of magnesium ions is greater than 50 mol % based on a total mole of metal ions in the metal salt solution.

Figure 2:
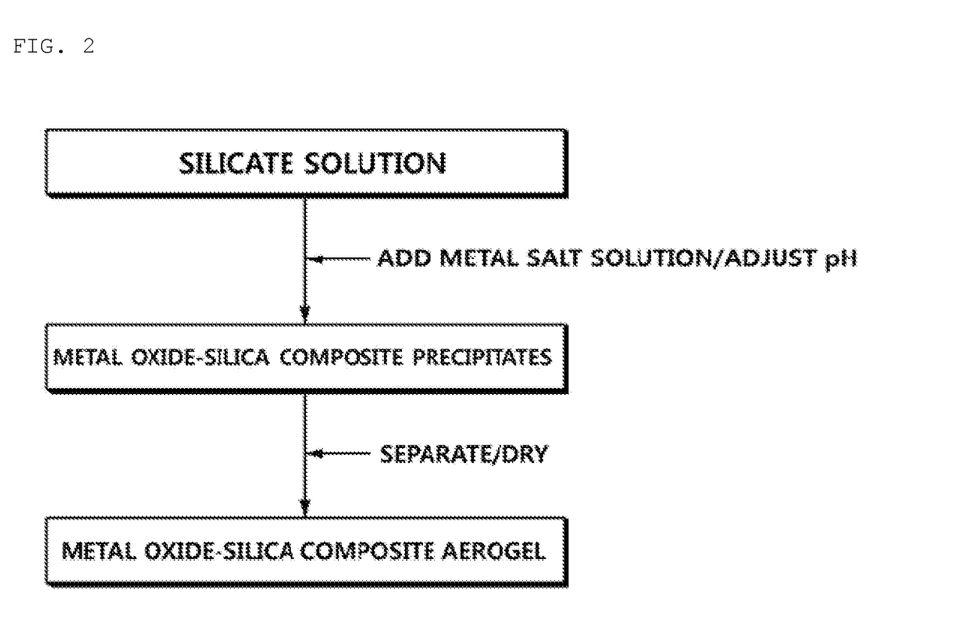
FIG. 2 is a block diagram sequentially illustrating a process of preparing a metal oxide-silica composite aerogel according to an embodiment of the present invention.

FIG. 2 is a block diagram sequentially illustrating a process of preparing a composite aerogel according to an embodiment of the present invention. FIG. 2 is only an example to illustrate the present invention, and the present invention is not limited thereto. Hereinafter, each step will be described in detail with reference to FIG. 2.

Step 1

In the method of preparing a composite aerogel according to the embodiment of the present invention, step 1 is a step of preparing a silicate solution including water glass ($Na_2SiO_3$) at a concentration of 0.125 M to 3.0 M.

The silicate solution may be prepared by dissolving the water glass ($Na_2SiO_3$) in a solvent, particularly water, at a concentration of 0.125 M to 3.0 M. In a case in which the silicate solution including the water glass within the above concentration range is used, the preparation of a metal oxide-silica composite aerogel having reduced tap density and increased specific surface area, particularly, a tap density of 0.41 g/ml or less and a specific surface area of 200 $m^2$/g or more is possible. If the concentration of the water glass is less than 0.125 M, an amount of silica in the finally prepared composite aerogel is low, and, if the concentration of the water glass is greater than 3.0 M, since the composite aerogel is formed in a more dense structure in a reaction solution, the tap density may be increased and the specific surface area may be reduced. Specifically, the silicate solution may include the water glass at a concentration of 1.5 M to 2.5 M in consideration of an increase in pore volume of 0.5 $cm^3$/g or more, in addition to a more reduced tap density of 0.15 g/ml or less and a more increased specific surface area of 300 $m^2$/g or more, and a resulting thermal conductivity reduction effect, and, for example, may include the water glass at a concentration of 2 M in consideration of a more reduced tap density of 0.1 g/ml or less, a more increased specific surface area of 450 $m^2$/g or more, an increase in pore volume of 0.8 $cm^3$/g or more, and a resulting significant thermal conductivity reduction effect. In this case, the water glass is not particularly limited, but the water glass may contain silica ($SiO_2$) in an amount of 28 wt % to 35 wt %, for example, 28 wt % to 30 wt %, based on a total weight of the water glass.

Also, the silicate solution may include the water glass ($Na_2SiO_3$) in an amount such that 0.04 M to 6.0 M of silica is included based on the silica ($SiO_2$) included in the water glass.

Step 2

In the method of preparing a composite aerogel according to the embodiment of the present invention, step 2 is a step of forming metal oxide-silica composite precipitates by reacting the silicate solution prepared in step 1 with a metal salt solution.

Specifically, after adding and mixing the metal salt solution having a metal ion concentration of 0.125 M to 3.0 M to the silicate solution prepared in step 1, the metal oxide-silica composite precipitates may be formed by adjusting a pH of a resulting mixture to be in a range of 3 to 9 by adding an acid catalyst.

The metal salt solution is prepared by dissolving a metal salt, as a raw material to allow a metal oxide to be formed in the finally prepared composite aerogel, in a solvent, wherein, specifically, the metal salt solution includes a magnesium (Mg)-containing metal salt in an amount such that an amount of magnesium ions is greater than 50 mol % based on a total mole of metal ions in the metal salt solution. In a case in which the amount of the magnesium ions in the metal salt solution is 50 mol % or less, thermal conductivity may be increased due to an increase in the tap density and rapid decreases in the specific surface area and the pore volume.

Specifically, the metal salt may include the magnesium-containing metal salt alone, or may be a salt including at least one metal selected from the group consisting of alkali metals, alkaline earth metals, lanthanides, actinides, transition metals, and Group 13 (IIIA) metals, in addition to the magnesium-containing metal salt, and, specifically, the metal salt may be halide, for example, chloride, including at least one metallic element selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W). Also, among the above-described metals, the metal may be appropriately selected depending the application of the composite aerogel, for example, the metal salt may be chloride including magnesium, calcium, or a mixed metal thereof in consideration of using the composite aerogel in applications requiring thermal insulation, and the metal salt may be magnesium chloride alone; or a mixture of magnesium chloride and calcium chloride in consideration of a decrease in the tap density and increases in the specific surface area and the pore volume of the prepared composite aerogel and a resulting thermal conductivity reduction effect.

Furthermore, in a case in which the metal salt includes two kinds of metal salts, it is desirable to add the two kinds of metal salts by adjusting a ratio of concentrations of each metal ion so as to satisfy a ratio of metallic elements in a metal oxide in the finally prepared composite aerogel. For example, with respect to a composite aerogel required to have an excellent thermal insulation performance, the composite aerogel may include MgO and CaO as the metal oxide, and, in this case, the metal salt may include a Mg-containing metal salt and a Ca-containing metal salt in amounts such that a molar ratio ($Mg^{2+}:Ca^{2+}$) of metal ions is in a range of 1.5:1 to 2.5:1 under a condition satisfying the concentration range of $Mg^{2+}$ ions in the metal salt solution. In a case in which the Mg-containing metal salt and the Ca-containing metal salt are mixed at such a mixing ratio, a metal oxide-silica composite aerogel having a tap density of 0.41 g/ml or less and a specific surface area of 200 $m^2$/g or more may be prepared. Furthermore, the Mg-containing metal salt and the Ca-containing metal salt may be included in amounts such that the molar ratio of $Mg^{2+}:Ca^{2+}$ is in a range of 1.95:1 to 2.1:1 under the condition satisfying the concentration range of $Mg^{2+}$ ions in the metal salt solution in consideration of an increase in pore volume of 0.5 $cm^3$/g or more, in addition to a more reduced tap density of 0.15 g/ml or less and a more increased specific surface area of 300 $m^2$/g or more, and a resulting thermal conductivity reduction effect. For example, the Mg-containing metal salt, particularly $MgCl_2$, and the Ca-containing metal salt, particularly $CaCl_2$, may be included in amounts such that the molar ratio of $Mg^{2+}:Ca^{2+}$ is 2:1 in consideration of a more reduced tap density of 0.1 g/ml or less, a more increased specific surface area of 450 $m^2$/g or more, an increase in pore volume of 0.8 $cm^3$/g or more, and a resulting significant thermal conductivity reduction effect.

Also, the metal salt may be used in an amount such that a concentration of metal ions derived from the metal salt in the metal salt solution is in a range of 0.125 M to 3.0 M. In a case in which the metal salt is used within the above concentration range, the preparation of a metal oxide-silica composite aerogel having reduced tap density and increased specific surface area, particularly, a tap density of 0.41 g/ml or less and a specific surface area of 200 $m^2$/g or more is possible. If the concentration of the metal ions is less than 0.125 M, since an amount of the metal oxide formed in the composite aerogel is small, an improvement effect due to the formation of the metal oxide is insignificant, and, if the concentration of the metal ions is greater than 3.0 M, physical properties including tap density of the composite aerogel may be reduced due to the formation of an excessive amount of the metal oxide. Specifically, the metal salt may be used in an amount such that the concentration of the metal ions in the metal salt solution is in a range of 0.4 M to 2.0 M in consideration of an increase in pore volume of 0.5 $cm^3$/g or more, in addition to a more reduced tap density of 0.15 g/ml or less and a more increased specific surface area of 300 $m^2$/g or more, and a resulting thermal conductivity reduction effect, and, for example, may be used in an amount such that the concentration of the metal ions in the metal salt solution is in a range of 0.5 M to 0.8 M in consideration of a more reduced tap density of 0.1 g/ml or less, a more increased specific surface area of 450 $m^2$/g or more, an increase in pore volume of 0.8 $cm^3$/g or more, and a resulting significant thermal conductivity reduction effect.

Furthermore, comparing with the concentration of the water glass in the silicate solution within the above-described concentration range, the metal salt may be used in an amount such that a molar ratio of water glass:metal ions is in a range of 1:1 to 5:1. In a case in which the metal salt is used within the above concentration range, the preparation of a metal oxide-silica composite aerogel having reduced tap density and increased specific surface area, particularly, a tap density of 0.41 g/ml or less and a specific surface area of 200 $m^2$/g or more is possible. If the concentration of the metal salt is outside the above molar ratio range, the tap density of the finally prepared composite aerogel may be increased. Specifically, the metal salt may be used in an amount such that the molar ratio of water glass:metal ions is in a range of 3:1 to 5:1 in consideration of an increase in pore volume of 0.5 $cm^3$/g or more, in addition to a more reduced tap density of 0.15 g/ml or less and a more increased specific surface area of 300 $m^2$/g or more, and a resulting thermal conductivity reduction effect, and, for example, may be used in an amount such that the molar ratio of water glass:metal ions is 3:1 in consideration of a more reduced tap density of 0.1 g/ml or less, a more increased specific surface area of 450 $m^2$/g or more, an increase in pore volume of 0.8 $cm^3$/g or more, and a resulting significant thermal conductivity reduction effect.

Also, the solvent used for the formation of the metal salt solution may be used without particular limitation as long as it may dissolve the above-described metal salt. Specifically, the solvent may include water or a hydrophilic polar organic solvent, and any one thereof or a mixture of two or more thereof may be used. Among these, since the hydrophilic polar organic solvent has excellent miscibility with the above-described silicate solution, the hydrophilic polar organic solvent may be uniformly present in a gel during the subsequent gelation. As a result, the solvent substitution step may be omitted during the subsequent preparation of the composite aerogel.

The hydrophilic polar organic solvent may specifically be an alcohol-based solvent. Also, the alcohol-based solvent may specifically be a monovalent alcohol such as methanol, ethanol, isopropanol, and butanol; or a polyvalent alcohol such as glycerol, ethylene glycol, propylene glycol, diethylene glycol, dipropylene glycol, and sorbitol, and any one thereof or a mixture of two or more thereof may be used.

Among these alcohol-based solvents, the alcohol-based solvent may be an alcohol having 1 to 8 carbon atoms in consideration of miscibility with water and uniform dispersibility in the silica gel. Also, in consideration of the efficiency of the subsequent modification reaction on the surface of the silica in addition to the above-described effect, the alcohol-based solvent may be a linear alcohol having 1 to 4 carbon atoms, such as methanol, ethanol, propanol, or n-butanol, and one alone or a mixture of two or more thereof may be used. For example, the alcohol-based solvent may be methanol, ethanol, or a mixture thereof.

The adding and mixing of the metal salt solution to the silicate solution may be performed according to a typical method.

Thereafter, a pH of a mixture obtained as a result of the mixing process is adjusted to be in a range of 3 to 9 by using an acid catalyst. In a case in which the pH of the mixed liquid is within the above range, the preparation of a metal oxide-silica composite aerogel having reduced tap density and increased specific surface area, particularly, a tap density of 0.41 g/ml or less and a specific surface area of 200 m$^2$/g or more is possible. If the pH of the mixed liquid is outside the above range, the tap density may be increased and the specific surface area and pore volume may be significantly reduced. In a case in which the pH of the mixture is 7 or more which indicates a neutral or basic condition, among hydrolysis and condensation reaction of the silica, the condensation reaction may occur, and, in a case in which the pH is greater than 9, a metal hydroxide may be formed due to an excessive OH$^-$ concentration in a reduction reaction of the metal ions to the metal oxide. As a result, in addition to the formation of the metal oxide-silica composite aerogel in a particle, the condensation reaction of the silica and the formation of the metal hydroxide occur to increase non-uniformity in the particle, the tap density may be increased, and the specific surface area may be reduced. Also, in a case in which the pH is less than 5 which indicates an acidic condition, since the concentration of OH$^-$ required for the reduction reaction of the metal ions is decreased, the reduction reaction may be reduced. In a case in which the pH is less than 3, since the concentration of OH$^-$ is excessively decreased, the reduction reaction is suppressed to generate a silica-forming reaction and the amount of the metal oxide, which plays a role in supporting the structure of the particle in the structural body, is reduced to intensify a shrinkage phenomenon during drying, and, as a result, an increase in the tap density and a decreased in the specific surface area may occur. As a result, the tap density of the finally prepared composite aerogel may be increased and the specific surface area and pore properties may be reduced.

In order to achieve an improvement effect having good balance of the tap density and the specific surface area and pore properties due to the pH adjustment, the pH of the mixed liquid may be adjusted to be in a range of 5 or more to less than 7, which indicates a weak acidic condition, for example, in a range of 5 to 6, by adding an acid catalyst.

The acid catalyst plays a role in increasing a formation rate of the composite precipitates by promoting a reaction of the silicate solution with the metal salt solution during the formation of the composite precipitates, wherein the acid catalyst may specifically include an inorganic acid such as hydrochloric acid, sulfuric acid, phosphoric acid, or nitric acid; or an organic acid such as acetic acid or citric acid, and any one thereof or a mixture of two or more thereof may be used. Among these acids, the acid catalyst may be an inorganic acid, for example, hydrochloric acid. When the hydrochloric acid is used, Cl$^-$ as well as H$^+$ ions, which mainly participate in the gelation of silica, is generated, and, in this case, since the acid catalyst including the same salt as the salt (Cl$^-$) generated from the metal ions is used as a reactant, the physical properties of the composite aerogel may be further improved by minimizing a side reaction due to the salt and it may be beneficial for wastewater treatment by unifying the salts in the wastewater after completion of the preparation.

When the pH is adjusted to be in a range of 5 or more to less than 7 by adding the acid catalyst to the mixture of the silicate solution and the metal salt solution, metal oxide-silica precipitates are formed and precipitated. For example, in a case in which MgCl$_2$ and CaCl$_2$ are used as the metal salt, MgO—CaO—SiO$_2$ composite precipitates are precipitated by a reaction of the following Reaction Formula 1.

[Reaction Formula 1]

Step 3

In the method of preparing a composite aerogel according to the embodiment of the present invention, step 3 is a step of preparing a metal oxide-silica composite aerogel by separating and then drying the metal oxide-silica composite precipitates precipitated in step 2.

In step 3, a separation process of the precipitated metal oxide-silica composite precipitates may be performed by a typical method, and may specifically performed by separating the precipitates from the solvent using a vacuum filter.

Before performing a drying process after the separation of the metal oxide-silica composite precipitates, a washing process for removing unreacted reactants (e.g., Si$^{4+}$, Mg$^{2+}$, or Ca$^{2+}$) and added ions (Na$^+$ or Cl$^-$, and so on) remaining in the precipitates may be selectively further performed. In this case, the method of preparing a composite aerogel according to the embodiment of the present invention may further include the washing process after the formation of the metal oxide-silica composite precipitates.

The washing process may be performed by a typical method. However, it is desirable to use a washing solvent in which it easily penetrates into pores in the silica gel particles due to excellent miscibility with an aqueous liquid phase, as the reaction solvent, during the washing process, it has a drying effect when combined with the subsequent drying process, and resulting shrinkage and deformation of the pores may less likely occur. Specifically, the washing solvent may include water; an alcohol-based compound such as methanol, ethanol, isopropanol, or propanol; a hydrocarbon-based compound such as hexane, octane, n-decane, n-heptane, n-undodecane, cyclohexane, or toluene; or a ketone-based compound such as methylethylketone or acetone, and any one thereof or a mixture of two or more thereof may be used. Among these compounds, the alcohol-based compound, for example, ethanol may be used in consideration of better affinity with water and an effect of minimizing the shrinkage and deformation of the pores during the drying process.

The washing process may be repeated once or twice or more, specifically, 3 to 5 times. Also, in a case in which the washing process is repeated twice or more, the washing process may be performed by using the same washing solvent or may be performed by using different kinds of washing solvents.

After the separation or washing process of the metal oxide-silica composite precipitates, a drying process is performed.

The drying process may be performed by a method such as a heat treatment or hot air injection. Also, a specific temperature condition during the drying process may be appropriately adjusted depending on the washing solvent, and, specifically, the drying process may be performed in a temperature range of 90° C. to 200° C.

The metal oxide-silica composite aerogel finally obtained after the drying process has an average particle diameter ($D_{50}$) of 7 μm to 15 μm, but, in a case in which the particle diameter is excessively large outside the above range, a milling process for obtaining an appropriate particle diameter may be selectively further performed.

The milling process may be performed by a typical method, and may be performed under conditions such that the average particle diameter ($D_{50}$) of the metal oxide-silica composite aerogel is in a range of 7 μm to 15 μm.

In the present invention, the average particle diameter ($D_{50}$) of the metal oxide-silica composite aerogel may be defined as a particle diameter at 50% in a cumulative particle diameter distribution. In this case, the average particle diameter of the metal oxide-silica composite aerogel may be measured by using a laser diffraction method, or the average particle diameter ($D_{50}$) at 50% in a cumulative particle diameter distribution of the measurement instrument may be calculated by using a particle size measurement instrument (Macrotrac Particle Size Analyzer S3500) as a dry analysis model.

As described above, the above-described metal oxide-silica composite aerogel having low tap density, high specific surface area and porosity, and low thermal conductivity may be prepared by controlling the concentration and pH of the reactants during the preparation of the composite aerogel by the reaction of the silicate solution with the meal salt solution, without performing aging, solvent substitution, and surface modification steps which are essentially required during the preparation of a typical metal oxide-silica composite aerogel. Specifically, the metal oxide-silica composite aerogel prepared by the above-described method may have an average particle diameter ($D_{50}$) of 7 μm to 15 μm, a tap density of 0.41 g/ml or less, and a Brunauer-Emmett-Teller (BET) specific surface area of 200 m$^2$/g or more, and, for example, may have an average particle diameter ($D_{50}$) of 7 μm to 15 μm, a tap density of 0.038 g/ml to 0.2 g/ml, and a BET specific surface area of 300 m$^2$/g to 600 m$^2$/g.

Since the method of preparing a metal oxide-silica composite aerogel according to the embodiment of the present invention may control the pore volume as well as the tap density and the BET specific surface area of the finally prepared metal oxide-silica composite aerogel by combining and optimizing the concentration of the water glass in the silicate solution, the concentration of the metal ions, the pH range of the mixture, the molar ratio of the water glass to the metal ions, and the molar ratio of the magnesium ion to the calcium ion in the metal salt, better thermal conductivity may be obtained. Specifically, the method of preparing a metal oxide-silica composite aerogel includes preparing a silicate solution by dissolving water glass at a concentration of 0.125 M to 3.0 M, for example, 1.25 M to 3.0 M; after adding and mixing a metal salt solution having a metal ion concentration of 0.125 M to 3.0 M, for example, 0.4 M to 2.0 M to the silicate solution, precipitating metal oxide-silica composite precipitates by adjusting a pH of a resulting mixture to be in a range of 3 to 9, for example, 5 or more to less than 7, which indicates a weak acidic condition, by adding an acid catalyst; and, after separating the metal oxide-silica composite precipitates, washing and drying the separated metal oxide-silica composite precipitates, wherein the silicate solution and the metal salt solution are used in amounts such that a molar ratio of water glass:metal ions is in a range of 1:1 to 5:1, for example, 3:1 to 5:1, and the metal salt includes $MgCl_2$ and $CaCl_2$ in amounts such that a molar ratio of magnesium to calcium is in a range of 1.5:1 to 2.5:1, for example, 1.95:1 to 2.1:1, wherein a molar ratio of magnesium ions to a total mole of metal ions included in the metal salt solution may be 50 mol % or more. When the method of preparing a metal oxide-silica composite aerogel is performed by the above-described optimally combined steps, a metal oxide-silica composite aerogel having a more reduced tap density of 0.038 g/ml to 0.15 g/ml, for example, 0.038 g/ml to 0.1 g/ml, a more increased specific surface area of 300 m$^2$/g or more, for example, 450 m$^2$/g to 600 m$^2$/g, and a pore volume of 0.5 cm$^3$/g or more, for example, 0.8 cm$^3$/g to 1.0 cm$^3$/g may be prepared.

As described above, the above-described metal oxide-silica composite aerogel having low tap density, high specific surface area and porosity, and low thermal conductivity may be prepared by controlling the concentration and pH of the reactants during the preparation of the composite aerogel by the reaction of the silicate solution with the meal salt solution, without performing aging, solvent substitution, and surface modification steps which are essentially required during the preparation of a typical metal oxide-silica composite aerogel.

Thus, according to another embodiment of the present invention, a metal oxide-silica composite aerogel prepared by the above-described preparation method is provided.

The metal oxide-silica composite aerogel is a composite in which silica aerogel and metal oxide are mixed in a composite aerogel structure, wherein it has low tap density, high specific surface area and porosity, and low thermal conductivity by controlling conditions during the preparation process.

Specifically, the metal oxide-silica composite aerogel has a tap density of 0.41 g/ml or less or 0.038 g/ml to 0.41 g/ml, particularly 0.038 g/ml to 0.15 g/ml, and more particularly 0.038 g/ml to 0.1 g/ml. In this case, the tap density of the metal oxide-silica composite aerogel may be measured using a tap density tester (TAP-2S, Logan Instruments Co.).

Also, in addition to the above-described tap density, the metal oxide-silica composite aerogel may have a BET specific surface area of 200 m$^2$/g or more or 200 m$^2$/g to 600 m$^2$/g, particularly 300 m$^2$/g to 600 m$^2$/g, and more particularly 450 m$^2$/g to 600 m$^2$/g. In the present invention, the specific surface area of the metal oxide-silica composite aerogel may be measured based on the amounts of nitrogen, which are adsorbed and desorbed according to partial pressure ($0.11 < p/p_o < 1$), using a Micromeritics ASAP 2010 analyzer.

Furthermore, the metal oxide-silica composite aerogel may have an average particle diameter ($D_{50}$) of 7 μm to 15 μm, for example, 8 μm to 15 μm. In the present invention, the average particle diameter ($D_{50}$) of the metal oxide-silica composite aerogel may be defined as a particle diameter at 50% in a cumulative particle diameter distribution. In this case, the average particle diameter of the metal oxide-silica composite aerogel may be measured by using a laser diffraction method, or the average particle diameter ($D_{50}$) at 50% in a cumulative particle diameter distribution of the measurement instrument may be calculated by using a particle size measurement instrument (Macrotrac Particle Size Analyzer S3500) as a dry analysis model.

Also, the metal oxide-silica composite aerogel may have a pore volume of 0.4 cm$^3$/g to 1.0 cm$^3$/g, particularly 0.5 cm$^3$/g to 1.0 cm$^3$/g, and more particularly 0.8 cm$^3$/g to 1.0 cm$^3$/g. In this case, the pore volume of the metal oxide-silica composite aerogel may be determined from an amount of mercury intruded into pores which is measured by mercury porosimetry analysis.

Furthermore, the metal oxide-silica composite aerogel may have a porosity of 80 vol % or more, or 90 vol % to 98 vol %, and may include micropores having an average pore diameter of 20 nm or less, or 5 nm to 15 nm. In this case, the average pore diameter and the porosity of the metal oxide-silica composite aerogel may be measured based on the amounts of nitrogen, which are adsorbed and desorbed according to partial pressure ($0.11<p/p_o<1$), using a Micromeritics ASAP 2010 analyzer.

Also, within the above-described ranges of the tap density, specific surface area, particle diameter, and pore diameter, low thermal conductivity and improved heat insulation effect may be obtained due to a volume occupied by the pores. Specifically, the metal oxide-silica composite aerogel may have a thermal conductivity of 30 mW/mK or less. In this case, the thermal conductivity may be measured at 25° C. using a thermal conductivity meter (HFM436 Lambda, NETZSCH).

In the metal oxide-silica composite aerogel, the silica aerogel has a porous particulate structure including a plurality of micropores, wherein it may include a microstructure, in which nano-sized primary particles, particularly, primary particles having an average particle diameter ($D_{50}$) of 100 nm or less, or 1 nm to 50 nm, are combined to form a cluster in the form of a mesh, i.e., a three-dimensional network structure.

Furthermore, since the metal oxide is immobilized by a silanol group present on a surface of the silica aerogel, it is describable to appropriately control density of the silanol group present on the surface of the silica in order to increase an immobilization efficiency between a negative charge of the surface of the silica aero gel and a positive charge of the metal oxide. Specifically, the density of the silanol group present on the surface of the silica may be $10/nm^2$ or less, or $5/nm^2$ to $7/nm^2$.

Accordingly, the silica aerogel may have a Brunauer-Emmett-Teller (BET) specific surface area of 50 $m^2/g$ to 700 $m^2/g$, an average particle diameter ($D_{50}$) of 10 μm to 150 μm, a porosity of 0.5 $cm^3/g$ to 2.4 $cm^3/g$, and an average pore diameter of the pores included in the silica aerogel of 0.5 nm to 40 nm. In a case in which the BET specific surface area, average particle diameter, porosity, or average pore diameter is outside the above range, for example, the average pore diameter is less than 0.5 nm, since the density of the silanol group is relatively increased, an absolute value of the negative charge is increased, and, as a result, the immobilization efficiency with respect to the positively charged metal oxide is increased, but hydrophilicity is also increased to reduce dispersibility of the metal oxide-silica composite aerogel. Also, in a case in which the average pore diameter is greater than 40 nm, since the density of the silanol group is relatively decreased, there is no concern that the dispersibility of the metal oxide-silica composite aerogel is reduced, but the immobilization efficiency may be reduced due to the low absolute value of the negative charge.

In the metal oxide-silica composite aerogel, the metal oxide may be used without particular limitation as long as it is used to form the composite aerogel by being immobilized by the silanol group on the surface of the silica aerogel. Specifically, the metal oxide may be an oxide including at least one metal selected from the group consisting of alkali metals, alkaline earth metals, lanthanides, actinides, transition metals, and Group 13 (IIIA) metals, may particularly be an oxide including at least one metallic element selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W), and may more particularly be magnesium oxide, calcium oxide, or a mixture thereof.

The metal oxide is discontinuously physically immobilized on the surface of the silica by electrical attraction between the relatively positively charged metal oxide and the negative charge due to the silanol group present on the surface of the silica aerogel. Accordingly, in order for the metal oxide to be immobilized on the surface of the silica easily and with excellent efficiency and simultaneously exhibit a sufficient effect, the metal oxide may have appropriate particle diameter and specific surface area. Specifically, the metal oxide may have a specific surface area of 20 $m^2/g$ to 100 $m^2/g$ and an average particle diameter of 5 nm to 300 nm.

Also, an amount of the metal oxide included in the composite aerogel may be adjusted depending on the application of the metal oxide-silica composite aerogel, but, specifically, the metal oxide may be included in an amount of 5 wt % to 80 wt % based on a total weight of the composite aerogel. Furthermore, the metal oxide may be included in an amount such that a molar ratio (molar ratio of Si/Me) of silicon (Si) included in the metal oxide-silica composite aerogel to metal (Me) included in the metal oxide is 1:1 to 3:1, particularly 1.5:1 to 3:1, and more particularly 3:1.

Specifically, according to another embodiment of the present invention, a metal oxide-silica composite aerogel having a tap density of 0.41 g/ml or less, for example, 0.038 g/ml to 0.15 g/ml and a specific surface area of 200 $m^2/g$ or more, for example, 300 $m^2/g$ to 600 $m^2/g$ is provided.

Also, specifically, according to another embodiment of the present invention, a metal oxide-silica composite aerogel having an average particle diameter ($D_{50}$) of 7 μm to 15 μm, a tap density of 0.038 g/ml to 0.1 g/ml, a specific surface area of 450 $m^2/g$ to 600 $m^2/g$, and a pore volume of 0.8 $cm^3/g$ to 1.0 $cm^3/g$, which includes a silica aerogel and a metal oxide, wherein the metal oxide includes magnesium oxide and calcium oxide in amounts such that a molar ratio of magnesium to calcium is in a range of 1.5:1 to 2.5:1, is provided by a preparation process configured by optimally combining the concentration of the water glass in the silicate solution, the concentration of the metal ions, the pH range of the mixture, the molar ratio of the water glass to the metal ions, and the molar ratio of the magnesium ion to the calcium ion in the metal salt.

As described above, since the metal oxide-silica composite aerogel prepared by the preparation method according to the present invention has excellent physical properties such as low tap density and high specific surface area, the metal oxide-silica composite aerogel is suitable for a catalyst, or heat insulation materials, lagging materials, or non-flammable materials of aircrafts, ships, automobiles, and building structures as well as plant facilities for insulation such as an industrial furnace or pipes of various industrial equipment.

Hereinafter, the present invention will be described in more detail, according to the following examples and experimental examples. However, the following examples and experimental examples are merely presented to exemplify the present invention, and the scope of the present invention is not limited thereto.

Example 1-1

Distilled water was added and mixed with water glass ($Na_2SiO_3$) to prepare a silicate solution. Separately, $MgCl_2$ and $CaCl_2$ were dissolved in distilled water to prepare a metal salt solution, and the metal salt solution was then added and mixed with the silicate solution. An HCl acid catalyst was added to the resulting mixture until a pH of the mixture became those described in the following Table 1. White precipitates were generated immediately when a reaction of the silicate solution with the metal salt solution occurred. After natural precipitation of the precipitates, a transparent solvent on an upper layer was separated and removed. The precipitates were repeatedly washed three times with deionized water and then vacuum filtered. A generated cake was disposed in an oven and then dried at a temperature of 105° C. to prepare a metal oxide-silica composite aerogel. In this case, an amount of each compound was used as described in the following Table 1.

Examples 1-2 to 1-5 and Comparative Example 1-1

Metal oxide-silica composite aerogels were prepared in the same manner as in Example 1-1 except that each reactant was used in an amount as described in the following Table 1.

Experimental Example 1

A change in tap density of each metal oxide-silica composite aerogel according to the addition of the acid catalyst was measured and evaluated for the composite aerogels prepared in Examples 1-1 to 1-5 and Comparative Example 1-1 using a tap density tester (TAP-2S, Logan Instruments Co.).

Also, a BET specific surface area was measured by a 6-point BET method according to a nitrogen gas adsorption-flow method using a porosimetry analyzer (Belsorp-II mini by Bell Japan Inc.).

Furthermore, with respect to a pore volume, an amount of mercury intruded into pores was measured by mercury porosimetry analysis, and the pore volume was determined therefrom.

The results thereof are presented in Table 1 below.

From the experimental results, since the composite aerogels prepared in a pH range of the mixed liquid of 3 to 9 had a tap density of 0.16 g/ml or less, a specific surface area of 250 $m^2$/g or more, and a pore volume of 0.5 $cm^3$/g or more, the composite aerogels had a thermal conductivity of 30 mW/mK or less, and, in particular, the composite aerogel of Example 1-3 prepared in a pH range of about 5 or more to less than 7 had a low tap density of 0.1200 g/ml or less. In contrast, with respect to Comparative Example 1-1 in which the pH is greater than 9, the thermal conductivity was increased due to higher tap density as well as low specific surface area and pore volume.

Also, the tap density of the composite aerogel was reduced as the pH was increased from 3 to 5.9, but the tap density was rather increased as the pH was increased greater than 5.9. Accordingly, it may be confirmed that an optimal pH range existed in which the tap density of the composite aerogel may be minimized. Specifically, when determined from the following Table 1, if a concentration ratio of $MgCl_2$ to $CaCl_2$ in the metal salt solution was 2:1 and a concentration ratio of the metal salt and the water glass was 1:3, it may be understood that the pH of the mixed liquid of the metal salt solution and the silicate solution was in a range of 3 to 9 to prepare a composite aerogel having a lower tap density of 0.15 g/ml or less, and the pH of the mixed liquid was in a range of 5 or more to less than 7, which indicated a weak acidic condition, particularly, 5 to 6 to prepare a composite aerogel having a lower tap density of 0.100 g/ml or less.

Experimental Example 2

Tap density and specific surface area of each metal oxide-silica composite aerogel according to the concentration ratio of metal ions were measured and evaluated.

Specifically, metal oxide-silica composite aerogels were prepared in the same manner as in Example 1-1 except that the preparation was performed at concentrations and pH values described in the following Table 2. Tap density was measured for the prepared composite aerogel by the same method as that in Experimental Example 1. Also, amounts of nitrogen, which were adsorbed and desorbed according to partial pressure ($0.11<p/p_o<1$), were measured using a Micromeritics ASAP 2010 analyzer, and a BET specific surface area of each composite aerogel was measured therefrom. The results thereof are presented in Table 2 below.

TABLE 1

| | Metal salt solution | | Silicate solution | | | Specific | | |
|---|---|---|---|---|---|---|---|---|
| | $MgCl_2$ concentration (M) | $CaCl_2$ concentration (M) | $Na_2SiO_3$ concentration (M) | Mixed liquid pH | Tap density (g/ml) | surface area ($m^2$/g) | Pore volume ($cm^3$/g) | Thermal conductivity (mW/mK) |
| Comparative Example 1-1 | 0.44 | 0.22 | 2 | 9.5 | 0.175 | 150 | 0.31 | 30.4 |
| Example 1-1 | 0.44 | 0.22 | 2 | 8.2 | 0.153 | 260 | 0.55 | 29.4 |
| Example 1-2 | 0.44 | 0.22 | 2 | 7.1 | 0.131 | 330 | 0.68 | 28.8 |
| Example 1-3 | 0.44 | 0.22 | 2 | 5.9 | 0.098 | 450 | 0.88 | 28.0 |
| Example 1-4 | 0.44 | 0.22 | 2 | 4.5 | 0.112 | 380 | 0.75 | 28.4 |
| Example 1-5 | 0.44 | 0.22 | 2 | 3.0 | 0.148 | 280 | 0.53 | 29.6 |

TABLE 2

| | Metal salt solution | | Silicate solution | | | Specific | | |
|---|---|---|---|---|---|---|---|---|
| | $MgCl_2$ concentration (M) | $CaCl_2$ concentration (M) | $Na_2SiO_3$ concentration (M) | Mixed liquid pH | Tap density (g/ml) | surface area ($m^2/g$) | Pore volume ($cm^3/g$) | Thermal conductivity (mW/mK) |
| Example 2-1 | 1.33 | 0.67 | 2 | 6.2 | 0.113 | 340 | 0.55 | 29.4 |
| Example 2-2 | 0.44 | 0.22 | 2 | 5.9 | 0.098 | 450 | 0.88 | 28.0 |
| Comparative Example 2-1 | 0.22 | 0.44 | 2 | 6.4 | 0.151 | 120 | 0.38 | 30.1 |
| Example 2-3 | 0.67 | 0.00 | 2 | 5.8 | 0.146 | 440 | 0.67 | 29.8 |
| Comparative Example 2-2 | 0.00 | 0.67 | 2 | 6.1 | 0.184 | 30 | 0.13 | 30.5 |
| Example 2-4 | 0.27 | 0.13 | 2 | 6 | 0.118 | 360 | 0.61 | 29.9 |

As a result of identifying the tap density, specific surface area, and pore volume of each composite aerogel according to types and mixing ratios of the metal salt in a pH range of 5 or more to less than 7, Examples 2-1 to 2-4, in which $Mg^{2+}$ ions in the metal salt were included in an amount of greater than 50 mol % based on a total mole of total metal ions, had more reduced tap density as well as increased specific surface area and pore volume in comparison to Comparative Example 2-2 not including $Mg^{2+}$ ions and Comparative Example 2-1 in which $Mg^{2+}$ ions were included, but the amount thereof was 50 mol % or less. In particular, in a case in which $MgCl_2$ and $CaCl_2$ were mixed and used under conditions satisfying the molar concentration range of the $Mg^{2+}$ ions, effects of improving the tap density, specific surface area, and pore volume of the composite aerogel were more significant in comparison to a case where $MgCl_2$ was used alone.

Also, in a case in which the molar ratio of the metal ions in the metal salt solution to the water glass in the silicate solution satisfied the condition of 1:3 as in Example 2-2, a more improved effect was obtained in comparison to a case where the molar ratio was in a range of 1:1 or 1:5.

Experimental Example 3

A change in tap density of each metal oxide-silica composite aerogel according to a silicate concentration was evaluated.

Specifically, metal oxide-silica composite aerogels were prepared in the same manner as in Example 1-1 except that the preparation was performed at concentrations and pH values described in the following Table 3. Tap density was measured for the prepared composite aerogel, and the results thereof are presented in Table 3 below.

TABLE 3

| | Metal salt solution | | Silicate solution | | | Specific | | |
|---|---|---|---|---|---|---|---|---|
| | $MgCl_2$ concentration (M) | $CaCl_2$ concentration (M) | $Na_2SiO_3$ concentration (M) | Mixed liquid pH | Tap density (g/ml) | surface area ($m^2/g$) | Pore volume ($cm^3/g$) | Thermal conductivity (mW/mK) |
| Example 3-1 | 0.22 | 0.11 | 1.00 | 5.8 | 0.204 | 280 | 0.49 | 30.9 |
| Example 3-2 | 0.28 | 0.14 | 1.25 | 5.9 | 0.168 | 340 | 0.54 | 30.4 |
| Example 3-3 | 0.33 | 0.17 | 1.50 | 6.2 | 0.134 | 390 | 0.68 | 29.4 |
| Example 3-4 | 0.39 | 0.19 | 1.75 | 5.9 | 0.118 | 420 | 0.64 | 28.8 |
| Example 3-5 | 0.44 | 0.22 | 2.00 | 6.0 | 0.098 | 450 | 0.88 | 28.0 |
| Example 3-6 | 0.56 | 0.28 | 2.50 | 5.7 | 0.145 | 410 | 0.58 | 29.1 |
| Example 3-7 | 0.67 | 0.33 | 3.00 | 6.3 | 0.198 | 320 | 0.55 | 30.0 |
| Comparative Example 3-1 | 0.22 | 0.11 | 1.00 | 9.3 | 0.402 | 90 | 0.18 | 34.2 |
| Comparative Example 3-2 | 0.44 | 0.22 | 2.00 | 9.5 | 0.175 | 150 | 0.31 | 30.4 |
| Comparative Example 3-3 | 0.67 | 0.33 | 3.00 | 9.5 | 0.311 | 100 | 0.21 | 33.4 |

As in Examples 3-1 to 3-2 of Table 3, when the composite aerogels were prepared under conditions in which the mixed metal salt of the Mg salt and the Ca salt was used at a mixing ratio of 2:1, a concentration ratio of the metal salt and the water glass was about 1:3, and a pH of the mixed liquid was in a range of 5 or more to less than 7, the composite aerogels having a low tap density of 0.41 g/ml or less, a specific surface area of 200 $m^2/g$ or more, and a pore volume of 0.5 $cm^3/g$ or more were prepared even if a concentration of the water glass included in the silicate solution was variously changed from 1.0 M to 3.0 M. Among them, the composite aerogel having a lower tap density of 0.15 g/ml or less, a specific surface area of 350 $m^2/g$ or more, and a pore volume of about 0.5 $cm^3/g$ or more was prepared when the concentration of the water glass included in the silicate solution was in a range of 1.5 M to 2.5 M, and, particularly, the composite aerogel having a lowest tap density of 0.10 g/ml or less, a specific surface area of 450 $m^2/g$ or more, and a pore volume of about 0.8 $cm^3/g$ or more was prepared when the concentration of the water glass was 2.0 M. From these results, it may be understood that, in order to prepare a composite aerogel having lower tap density, the concentration of the water glass included in the silicate solution was in a range of 1.5 M to 2.5 M, for example, 2.0 M.

The invention claimed is:

1. A method of preparing a metal oxide-silica composite aerogel, the method comprising:
   preparing a silicate solution by dissolving water glass at a concentration of 0.125 M to 3.0 M;
   adding and mixing a metal salt solution having a metal ion concentration of 0.5 M to 0.8 M to the silicate solution;
   precipitating metal oxide-silica composite precipitates by adjusting a pH of a resulting mixture to be in a range of 5.7 or more to less than 7 by adding an acid catalyst;
   separating the metal oxide-silica composite precipitates; and
   drying the metal oxide-silica composite precipitates by heat treatment or hot air injection to yield the metal oxide-silica composite aerogel,
   wherein the metal salt solution comprises a magnesium (Mg)-containing metal salt in an amount such that an amount of magnesium ions is greater than 50 mol % based on a total mole of metal ions in the metal salt solution, and
   wherein the metal salt comprises $MgCl_2$ and $CaCl_2$ in amounts such that a molar ratio of magnesium ions to calcium ions is in a range of 1.95:1 to 2.1:1.

2. The method of claim 1, wherein the silicate solution and the metal salt solution are used in amounts such that a molar ratio of water glass:metal ions is in a range of 1:1 to 5:1.

3. The method of claim 1, wherein the acid catalyst is an inorganic acid.

4. The method of claim 3, wherein the acid catalyst comprises hydrochloric acid.

5. The method of claim 1, wherein the metal salt further comprises a salt including at least one metal selected from the group consisting of alkali metals, alkaline earth metals (except magnesium), lanthanides, actinides, transition metals, and Group 13 (IIIA) metals.

6. The method of claim 1, wherein the drying is performed in a temperature range of 90° C. to 200° C.

7. The method of claim 1, comprising:
   preparing a silicate solution by dissolving water glass at a concentration of 0.125 M to 3.0 M;
   adding and mixing a metal salt solution having a metal ion concentration of 0.5 M to 0.8 M to the silicate solution to form a mixture;
   precipitating metal oxide-silica composite precipitates by adjusting a pH of the mixture to be in a range of 5.7 or more to less than 7 by adding an acid catalyst; and
   separating the metal oxide-silica composite precipitates;
   washing the separated metal oxide-silica composite precipitates; and
   drying the washed separated metal oxide-silica composite precipitates at 90° C. to 200° C. to yield the metal oxide-silica composite aerogel,
   wherein:
   the silicate solution and the metal salt solution are used in amounts such that a molar ratio of water glass:metal ions is in a range of 1:1 to 5:1,
   the metal salt solution comprises a magnesium (Mg)-containing metal salt in an amount such that an amount of magnesium ions is greater than 50 mol % based on a total mole of metal ions in the metal salt solution, and
   the metal salt comprises $MgCl_2$ and $CaCl_2$ in amounts such that a molar ratio of magnesium ions to calcium ions is in a range of 1.95:1 to 2.1:1.

8. The method of claim 1, wherein the metal oxide-silica composite aerogel has a tap density of 0.41 g/ml or less and a Brunauer-Emmett-Teller (BET) specific surface area of 200 m$^2$/g or more.

9. The method of claim 8, wherein the metal oxide-silica composite aerogel has a pore volume in a range of 0.4 cm$^3$/g to 1.0 cm$^3$/g.

* * * * *